United States Patent [19]

Hellwig et al.

[11] Patent Number: 4,649,720
[45] Date of Patent: Mar. 17, 1987

[54] DEVICE FOR AND A METHOD OF CONTROLLING KNITTING MACHINES

[75] Inventors: Claus Hellwig; Ernst-Heinrich Hempel; Peter Kunath; Ulf Rinckleb, all of Karl Marx Stadt, German Democratic Rep.

[73] Assignee: VEB Kombinat Textima, Karl Marx Stadt, German Democratic Rep.

[21] Appl. No.: 807,437

[22] Filed: Dec. 9, 1985

[30] Foreign Application Priority Data

Dec. 27, 1984 [DD] German Democratic Rep. ... 271524

[51] Int. Cl.⁴ .......................... D04B 7/00; D04B 15/66
[52] U.S. Cl. ..................................................... 66/75.2
[58] Field of Search .......................... 66/75.2, 75.1, 64

[56] References Cited

U.S. PATENT DOCUMENTS 3,825,900  7/1974  Anderson ............................. 66/75.2
4,167,861  9/1979  Krause .................................. 66/75.2
4,510,774  4/1985  Rose ..................................... 66/75.2

FOREIGN PATENT DOCUMENTS 2658588  1/1980  Fed. Rep. of Germany .

Primary Examiner—Ronald Feldbaum
Attorney, Agent, or Firm—Michael J. Striker

[57] ABSTRACT

In a straight and circular knitter, a control arrangement for supplying information upon needle selection on circulation knitting carriages includes a central control station provided with a main computer storing all information for controlling the knitting machine. Each knitting carriage is equipped with a control unit including an auxiliary computer, an end stage for operating the needles and a bus control circuit. The main computer is connected to respective circulating control units via a slide contact track and contact shoes coupled to respective auxiliary computers. The microprocessors in respective control units are interconnected by a bus including a transmitting line, a receiving and a bus control line. The bus control line forms with the bus control circuits and microcomputers of respective control units a closed loop which controls the transmission of error data to the main computer in the event that an error is detected in a control unit.

8 Claims, 3 Drawing Figures

DEVICE FOR AND A METHOD OF CONTROLLING KNITTING MACHINES

BACKGROUND OF THE INVENTION

The present invention relates to a device for controlling knitting machines of the type having stationary needle boards and a set of knitting carriages circulating in one direction above the needle boards and each including needle selection elements and a control unit for operating the needle selection elements, and a stationary central control unit including a main computer.

From the U.S. Pat. No. 4,510,774 a control device for straight and circular knitters is known which includes a stationary control part and a moving control part circulating with one of the knitting carriages and including a microprocessor with corresponding data processing peripherals. Both the stationary control part and the movable control part operate independently one of the other whereby the stationary part stores data for stationary structural units of the knitting machine and the movable part stores data for knitting patterns for one or more knitted products. Entry of data for the movable control part takes place during the stoppage of the machine by means of a special reader or via a cable leading to the stationary control part. Flexible cables are used for transmitting commands for the pattern dependent needle selection and for the actuation of the movable knitting carriages, the flexible cables being connected to the movable control part on the carriage.

This prior art solution has the disadvantage that data transfer from and to the movable control part can occur only during the standstill of the machine. During the working cycle of the machine no correction or change of the knitted pattern is possible. Moreover, an additional carriage which is not used for the actual knitting process is necessary for supporting the movable control part.

Known is also a control arrangement for straight and circular knitting machines having circulating set of knitting carriages, a central control unit arranged at the center of circulation of the knitting carriages and rotating in synchronism with the latter, the central control unit including a main computer connected via trailing cables to auxiliary control units on respective knitting carriages. Each knitting carriage supports setting members for selection of needles and controlling the switching functions and also includes sensors for controlling the timing of the needles. All information for controlling the knitting process is stored in the main computer of the central control unit, the computer including an input and output, memory and the corresponding data and addressing buses.

The input of knitting information into the main microcomputer even in this case is possible only during the standstill of the machine by applying a data input apparatus, and so is also the central adjustment of the control elements to be activated such as for example for staggering or removal of the product. Also the overall actuation of the control field and a differentiated error indication in this prior art arrangement needs an improvement. The trailing cables have the disadvantage of a costly installation and design to meet the requirements for data transmission. Moreover, due to the continuous change in length during the circulation of the assigned knitting carriages on an elliptical track, the cables are subject to high loads and wear.

From the German publication DE-AS No. 2,658,588 a control arrangement for straight and circular knitting machines is known in which the pattern controlling pulses are transmitted to unidirectionally circulating knitting carriages from a stationary transmitter. Each knitting carriage is equipped with a convertor for converting the pattern signals into corresponding data words, a data processing unit including a microprocessor, a clock for delivering clock pulses to the data processing unit in synchronism with the needles, a memory for storing data pertaining to at least one knitted row, an end amplifier and a control device for operating the needles. For transmitting control information, there are devised acoustic and electromagnetic transfer elements, for example in the form of a light conductive rod, a bundle of light conductive fibers, a carrier frequency transmitter and the like. This known solution however permits the data transmission in one direction only and consequently there is no safeguard against a malfunction or errors. For transmitting error signals from the circulating knitting carriages to the stationary control unit it is necessary to use additional means which are not specified in this publication. In addition, susceptibility of the optical and electromagnetic data transmission means to interferences and soiling the reliability of the controlling operation is impaired.

SUMMARY OF THE INVENTION

It is therefore a general object of the present invention to overcome the aforementioned disadvantages.

More particularly, it is an object of the invention to provide an improved arrangement for controlling straight and circular knitting machines with a circulating set of knitting carriages and with selection of individual needles so that the operativeness and reliability of the machine is increased.

Another object of this invention is to provide such an improved controlling arrangement which in comparison with prior art controlling devices is less expensive to manufacture and more convenient to operate.

Another object of this invention is to improve the transfer of pattern controlling data to individual knitting carriages.

A further object of this invention is to provide a fast and detailed error indication signal.

Furthermore, an object is to provide such an improved arrangement of storing and data processing capacity of the machine controlling means which minimizes the length of conduits from the stationary central control unit to the circulating knitting carriages and vice versa and at the same time guarantees an exact and reliable operation of all setting members for the needle movement in synchronism with the needles of all knitting systems and monitoring means.

In keeping with these objects and others which will become apparent hereafter, one feature of the invention resides in the provision of a slide contact track connected via a serial duplex interface with the main computer in the stationary central control unit, the movable knitting carriages being interconnected by a bus including a bit serial transmitting line and a bit serial receiving line connected respectively via sliding contacts with said slide contact track, a plurality of movable control units associated with respective knitting carriages and each including an auxiliary computer having a control data input, a control data output, a proceed to send control input and a proceed to send control output, the data input and output being connected to corresponding receiving and transmitting line of the bus, and a bus control circuit including a bus control line connecting in series the proceed to send control output in a preceding control unit to the proceed to send control input of a subsequent control unit, the bus control line forming with the bus control circuit and the control units on respective carriages a closed loop.

The microprocessor in each movable control unit is coupled to respective transmitting and receiving lines of the bus via corresponding bus drivers and via sliding shoes to corresponding rails of the slide contact track. The bus control circuit in each control unit includes buffers, negators, AND gates, NAND gates and terminals leading to the proceed to send terminals of the microprocessor. The microprocessor is further coupled to a program memory, data memory, an end stage amplifier, a clock generator and an error monitor which serves for interrupting and repeating the transmission of the same control data if an error is detected.

The bus control circuit in an arbitrary last control unit is provided with a negated output connected via a feedback branch to a proceed to send input of a subsequent leading control unit, thus forming the closed monitoring loop.

According to another feature of this invention, in the case of even number of knitting carriages the proceed to send control input of an arbitrary leading carriage is connected to an output buffer of the bus control circuit of the last control unit without negation while the negator is employed only in the case of an odd number of the knitting carriages.

Preferably, the entire bus consisting of the transmitting line, the receiving line and the bus control line is constructed in the form of a light conductive cable.

According to the method of controlling the knitting machine of the above described kind, control data such as pattern data from the main computer in the stationary control unit are transmitted in a series of bits via the receiving line to a data input of a movable control unit, then the series of data is transferred via the bus control line to the remaining control units, then the data are stored in each of the control units and simultaneously evaluated as to transmission errors, and if an error is detected, then the transmission is interrupted and repeated until no error is detected and if necessary a stop signal is transmitted via the transmitting line into the main computer to stop the machine.

The error detection of the transmitted data is performed by sensors located on respective knitting carriages. In order to prevent a simultaneous transfer of error signals from several control units to the transmission line, each control unit receives a proceed to send signal only then when the preceding control unit supplies a corresponding command to the control input of the subsequent control unit. In the case of transmission of a signal to the transmitting line, the corresponding bus control circuit interrupts the transmission of the subsequent control units by outputting a negating or non-negating control signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
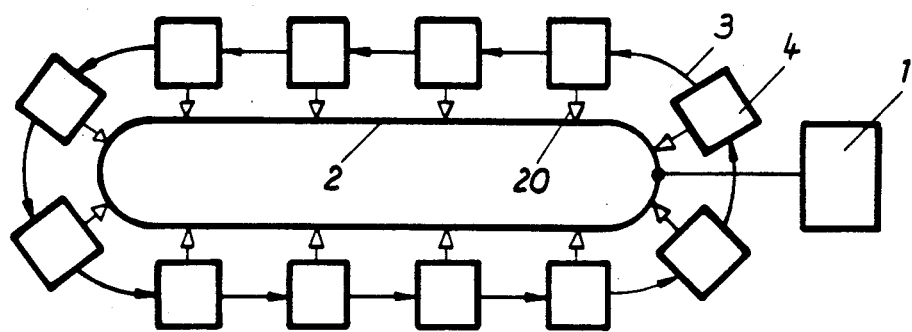
FIG. 1 is a schematic top view of the control arrangement according to this invention on a straight and circular knitter.

A straight and circular knitting machine having two pairs of needle boards arranged one after the other and cooperating with uni-directionally circulating knitting carriages is in accordance with this invention equipped with a stationary central control station 1 and with a plurality of control units 4 arranged on respective knitting carriages. The central control station 1 which is in the form of a main computer, includes a microprocessor with a memory 10 which is loaded via input and output 13 with all controlling and knitting pattern defining information for processing the knitted product. Communication between an operator and the central control station 1 is effected through an operating and display unit 12. In addition, the station 1 is provided with control signal outputs 14 for operating stationary setting members, motors, circuit breakers and the like, and with control data inputs 15 for receiving signals from stationary switches, sensors, measuring data transmitters and the like. In this manner, stationary parts of the knitting machine such as needle boards staggering or withdrawal of knitted wear are controlled from terminals 14 and 15 and also monitored.

The transmission of controlling and pattern determining information from the central control station 1 to individual movable control units 4 takes place via a serial duplex interface 11, a slide track 2 and slide shoes 20 provided on each control unit 4 of respective knitting carriages. Each control unit 4 receives the information carrying data for each knitted row before each cycle of the knitting carriages. The data contain for example information for controlling setting members for selecting individual needles according to the desired pattern over the entire width of the fabric, for the exchange of yarn guides, for controlling lock bars, for monitoring the knitted fabric and the yarn feed inclusive of monitoring controlling information for recognizing errors. In order to increase the reliability of the data transfer the signals picked up by slide contacts 20 are applied to transmitting line 30 and a receiving line 31 of a serial bus 3, the latter being flexibly connected from one knitting carriage to another.

In each movable control unit 4 there is provided a microprocessor 40 having a serial data input connected via buffer 42 to the receiving line 31 and a control data output connected via buffer 41 to the transmitting line 30 of the bus 3. The microprocessor 40 evaluates the received control data and acknowledges the receipt. If the receipt is not acknowledged, the transmission of the same data is repeated. Thereafter the data in the microprocessor are processed according to a program stored in the program memory 44 and loaded in a data memory 45 wherefrom in synchronism with clock 47 for synchronizing the needles the data are read out and supplied via end amplifier 46 to individual setting members for selecting the needles for example. A channel serving for the above mentioned acknowledgment of the received data is formed of the serial data output of the microprocessor 40, the buffer or bus driver 41, the transmitting line 30, the corresponding transmitting rail of the sliding track 2, the sliding shoes 20 and the input of the serial duplex interface 11. This return channel serves in addition for transmitting condition and error signals which are generated mostly by switches and sensors contained in an error monitoring unit 48.

Figure 2:
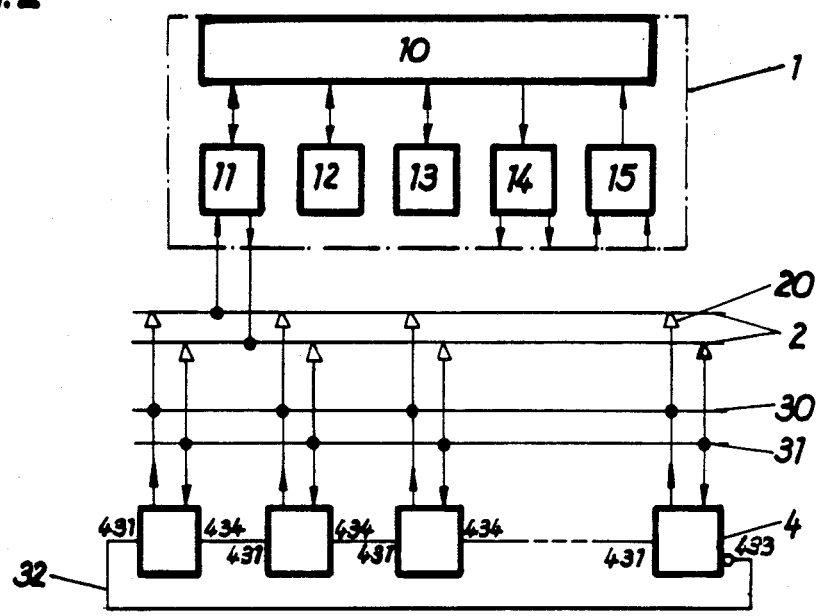
FIG. 2 is a block circuit diagram of the interrconnection of the stationary central control station with circulating control units on respective knitting carriages.
Figure 3:
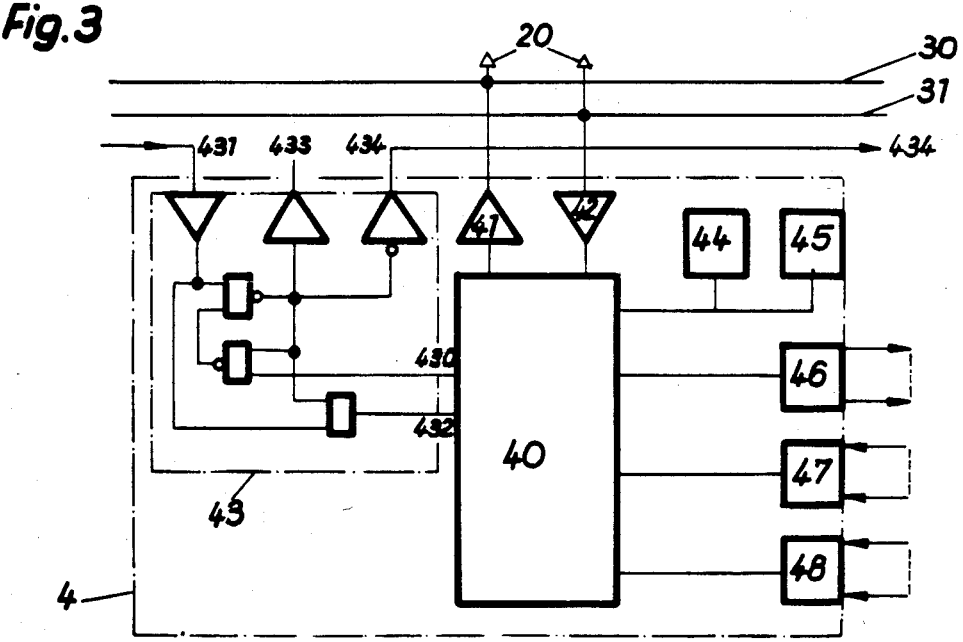
FIG. 3 is a block diagram of a control unit on a knitting carriage.

In order to avoid interference on the transmitting line 30 which might result for example due to signal superposition, each movable control 4 is provided with a bus control circuit 43. The bus control circuit is connected with preceding and following knitting carriages through a bus control line 32. The section of line 32 between the consecutive control inputs and outputs 433 and 434 of respective bus control circuits 43 and the return branch between the negated output 433 of the last control unit 4 and the input 431 of a control unit in an arbitrary leading knitting carriage (FIG. 2) form a closed loop. In the chain of control units 4, only a single control unit receives a proceed to send signal from the bus control circuit 43 to the control input 432 of the microprocessor. A prerequisite condition for the transmission of a control signal through the bus driver 41 to the transmitting line 30 is, apart form the presence of the proceed to send signal at the circuit 43 of the preceding control unit 4, a request for transmit signal at the terminal 430 of the microprocessor. When the two conditions are fulfilled, the signal at the output of negator 434 is applied to the subsequent control unit 4 and the latter is free to transmit. The negator 434 thus serves for controlling the blocking or unblocking of the transmission of control signals from the microprocessor.

The buffer input 431 of an arbitrary first or leading control unit 4, in contrast to the corresponding buffer inputs of all remaining control units is supplied with a negated signal from the output 433 of the last control unit in the set. The reason for the negation is the fact that upon bussing the free to send signal through all ring connected control units 4 a send prohibiting signal generated by the reversed signal condition has to be applied to the buffer input 431 in the first unit. In this manner the buffer inputs 431 of all intermediate control units 4 are consecutively supplied with a transmission interrupting signal. Inasmuch the negating buffer output 433 of the last control unit 4 reverses again this interrupt, the input 431 of the first control unit is again supplied with a proceed to send signal and so are the subsequent bus control circuits 43 of the intermediate controls 4 until a request to transmit is present at one of the control units. This process is continuously repeated.

In the case of an even number of control units 4 of the knitting carriages, it is possible to connect the noninverting buffer 433 of the bus control circuit in the last control unit 4 with the input of a noninverting buffer 431 in the bus control circuit 43 of an arbitrary first control unit 4; in the case of an odd number of control units however it is necessary to use the inverter 434 in the bus control circuit of the last control unit for connection with the noninverting buffer 431 in the first control unit. In the latter case, the inverting buffers 434 of bus control circuits of the intermediate control unit are connected to noninverting buffer 431 of the bus control circuit of the subsequent control unit so as to form the closed loop of a ring.

In a modification of this invention, the transmitting line 30, the receiver line 31 and the bus control line 32 of the bit serial bus 3 can be in the form of light conduits provided with nonillustrated means for converting electrical signals into light signals and for branching and coupling the light conduits to respective control units.

While the invention has been illustrated and described as embodied in a specific example of the control arrangement for straight and circular knitters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for controlling knitting machines of the type including stationary needle beds, a plurality of knitting carriages circulating in one direction above the needle beds and each including needle selection elements and a control unit for operating the needle selection elements, and a central control station including a main computer, the arrangement comprising a slide contact track connected via a serial duplex interface with said main computer, the movable knitting carriages being interconnected by a bus including a bit serial transmitting line and a bit serial receiving line and being connected via sliding contacts with said slide contact track; said movable control units including respectively an auxiliary computer having a control data input coupled to said receiving line and a control data output coupled to said transmitting line of the bus, a control output and a control input; and a bus control circuit including a bus control line connecting in series the control outputs of a preceding control unit to the control input of a subsequent control unit to deliver proceed to send or interrupt control signals, the bus control line forming with the bus control circuit and with the control units a closed loop.

2. An arrangement as defined in claim 1 wherein said auxiliary computer in each control unit is coupled to said transmitting and receiving lines of the bus via bus driving buffers, and further comprising a program memory, a data memory, an amplifying end stage for controlling the needle selection elements, a clock operating at the rate of needle movement and an error monitoring circuit.

3. An arrangement as defined in claim 2, wherein said bus control circuit includes an input buffer, an output buffer and an output negator and coupling means connected to the control input and output of the auxiliary computer to delivery in response to an error signal from said error monitor a proceed to send signal to one of said control units while interrupting the transmission in the remaining control units.

4. An arrangement as defined in claim 3, wherein in the case of even number of control units the noninverting buffer of the bus control circuit in an arbitrary first control unit is connected to a noninverting output buffer of the bus control circuit in the last control unit whereas in the case of an odd number of control units the noninverting input buffer of the first unit is connected to the inverting output buffer of the last control unit.

5. An arrangement as defined in claim 1, wherein said transmitting line, said receiver line and said bus control line are in the form of light conduits.

6. A method of controlling a knitting machine of the type, including stationary needle beds, a plurality of knitting carriages circulating in one direction above the needle beds and each including needle selection elements and a control unit for operating the needle selection elements, a central control station including a main computer, a slide contact track connected via a serial duplex interface with the main computer, the movable knitting carriages being interconnected by a bus including a bit serial transmitting line and a bit serial receiving line and being connected via sliding contacts with the slide contact track, the movable control units including respectively an auxiliary computer having a control data input coupled to the receiving line and a control data output coupled to the transmitting line of the bus, a control output and a control input; and a bus control circuit including a bus control line connecting in series the control outputs of a preceding control unit to the control input of a subsequent control unit to deliver proceed to send or interrupt control signals, the bus control line forming with the bus control circuit and with the control units a closed loop, the method comprising the steps of transmitting via the receiving line bit series of control data such as pattern control data from the main computer to a control data input of an auxiliary computer in a control unit;

transferring via the bus control line the series of control data to the remaining control units;

storing the control data in each control unit and simultaneously evaluating the data as to transmission errors whereby in the event of a detection of an error, interrupting and repeating the transmission of the control data from the main computer until no error is detected or transmitting via the transmitting line a stop signal for stopping the operation of the knitting machine.

7. A method as defined in claim 6, wherein in order to prevent interference of the transmitted stop signal a single control unit receives a proceed to send signal from the bus control circuit of the preceding control unit whereas the transmission of the remaining control unit is interrupted.

8. A method as defined in claim 7, wherein in the case of transmission of a stop signal the bus control circuits of the remaining control units interrupt the transmission of the proceed to send control signal between the input buffer and the output buffer or the negator.

* * * * *